United States Patent [19]

Francis

[11] 3,732,967
[45] May 15, 1973

[54] ORIENTATION APPARATUS
[76] Inventor: Theodore R. Francis, 855 Richard Street, Aurora, Ill. 60506
[22] Filed: Dec. 3, 1971
[21] Appl. No.: 204,537

[52] U.S. Cl. .............................. 198/33 AC, 193/43 B
[51] Int. Cl. .............................................. B65g 47/24
[58] Field of Search ................. 198/33 AA; 221/172; 193/43 R, 43 B

[56] References Cited

UNITED STATES PATENTS 3,084,782    4/1963    Bower .......................... 198/33 AA Primary Examiner—Harvey C. Hornsby
Assistant Examiner—James W. Miller
Attorney—George H. Gerstman

[57] ABSTRACT

Apparatus for orienting generally non-cylindrical and non-spherical asymmetrical items, such as keys. The item enters an inlet slot which feeds it to an orientation station having (1) a central support, and (2) means for preventing the item from pivoting until a selected portion of the item engages a beveled portion of the orientation station. When such engagement occurs, the item is cammed to pivot about the central support in a predetermined direction to achieve selected orientation.

7 Claims, 9 Drawing Figures

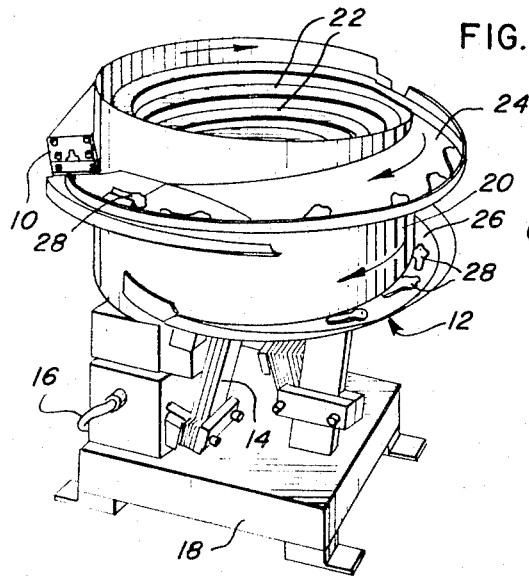
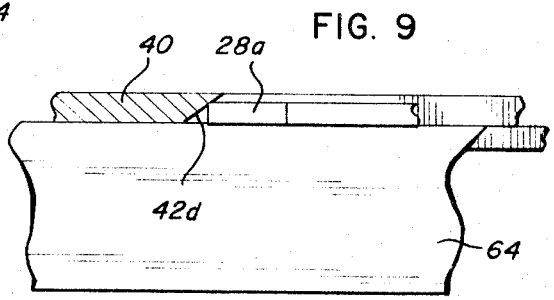
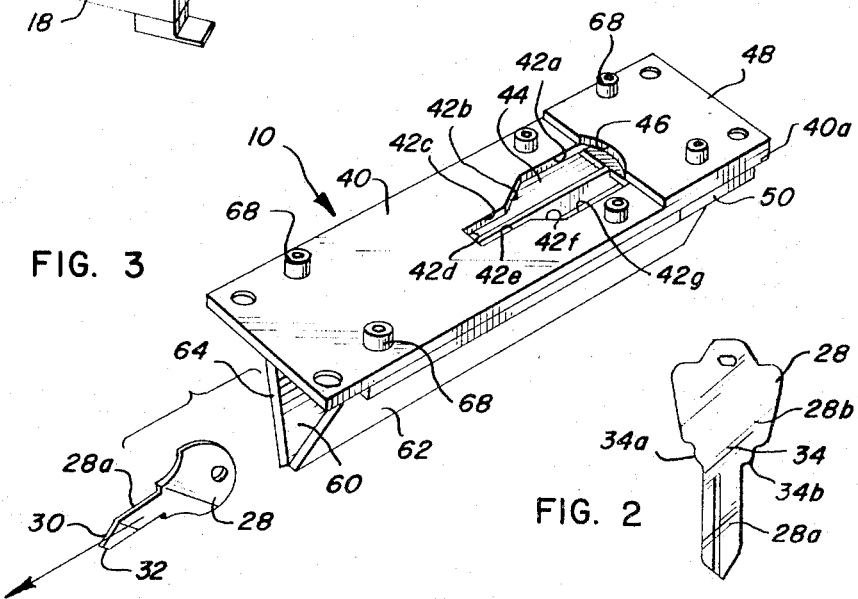
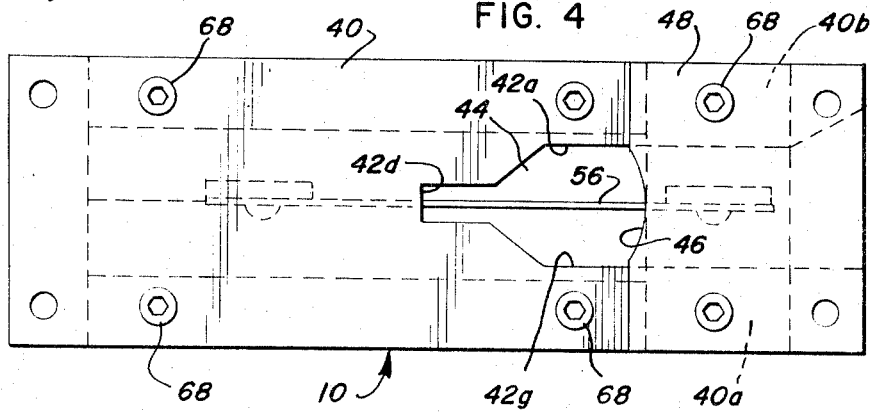

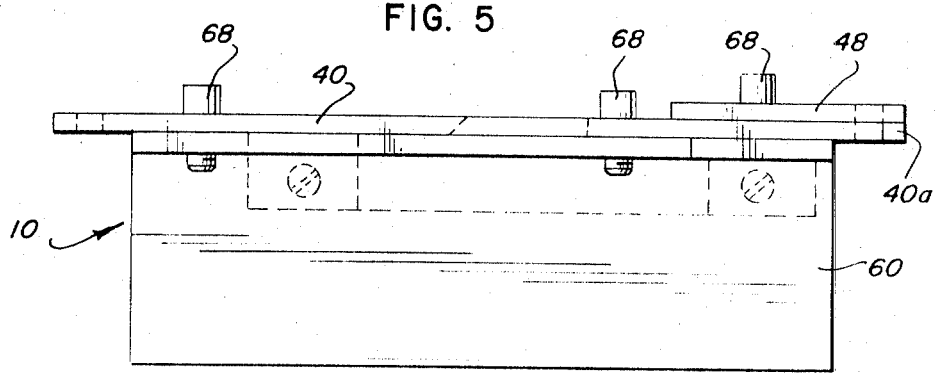
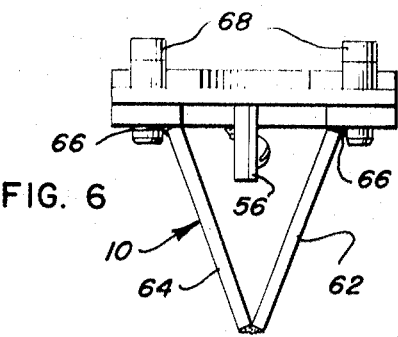
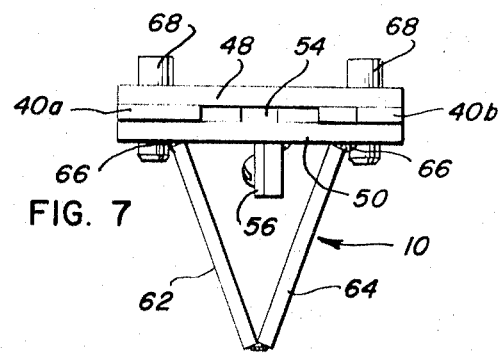
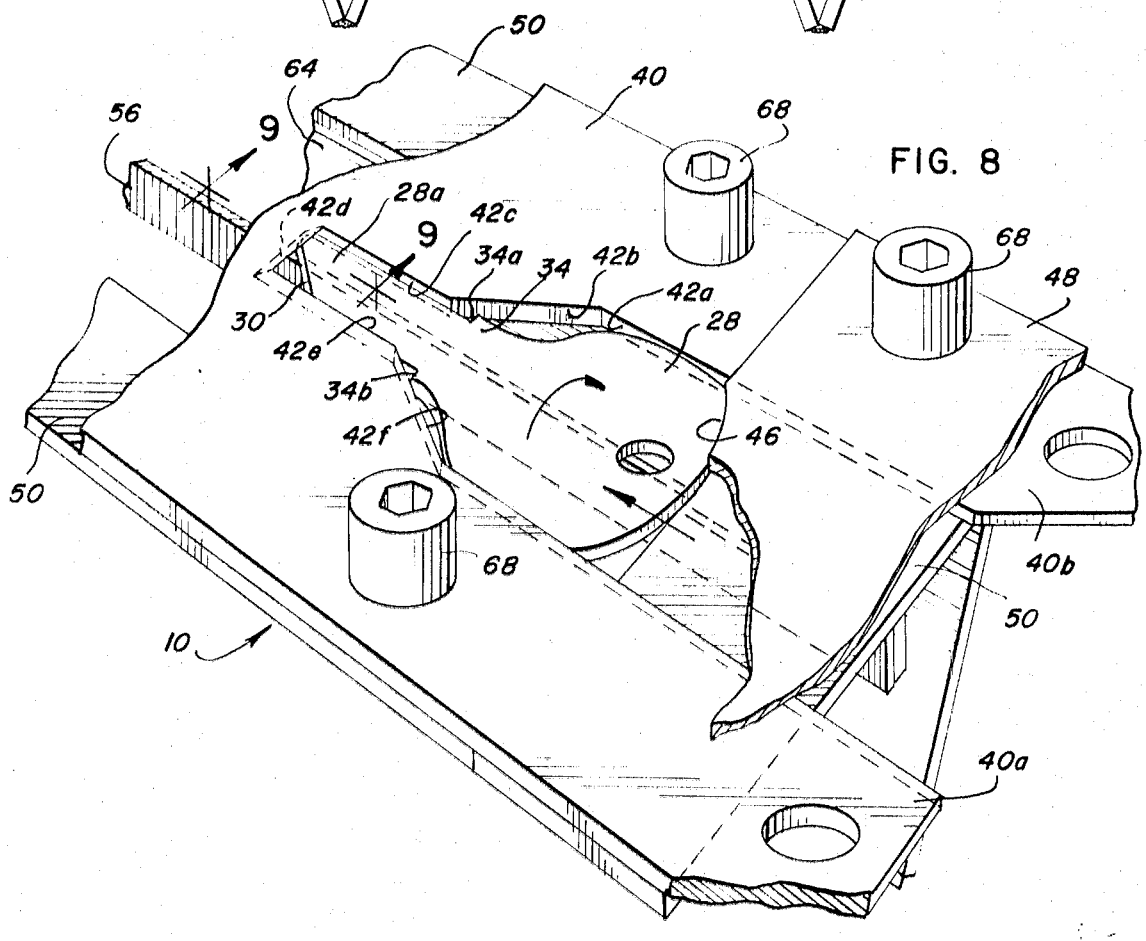

ORIENTATION APPARATUS

BACKGROUND OF THE INVENTION

This invention concerns apparatus for orienting generally non-cylindrical and non-spherical asymmetrical items.

Although the illustrative embodiment of the present invention concerns the orientation of keys, it is to be understood that the present invention is useful in connection with orienting various types of non-cylindrical and non-spherical asymmetrical items other than keys.

The orientation of asymmetrical items is well known in the art. Typically, the items are fed by a conveyor to an orientation station or stations where the items engage devices for causing the items to obtain a selected orientation or else be fed back to the conveyor and again transported to the orientation station for selected orientation. I have discovered the usefulness of having the ability to automatically orient generally non-cylindrical and non-spherical asymmetrical items, such as keys, in a selected attitude for subsequent milling, biting, stamping, cutting, ringing or any other requirement. To this end, I have invented orientation apparatus which operates very rapidly and properly orients, to a selected attitude, substantially all of the items fed to it without requiring a large number of feedbacks.

Accordingly, an object of the present invention is to provide apparatus for orienting generally non-cylindrical and non-spherical asymmetrical items, which apparatus is capable of producing very rapid orientation without the need to refeed a large number of items for proper orientation.

A further object of the present invention is to provide such an apparatus that is simple in design and can be manufactured economically.

A still further object of the present invention is to provide such an apparatus which can be easily connected to existing feeding devices to achieve an automated orientation system.

Other objects and advantages of the present invention will become apparent as the description proceeds.

BRIEF DESCRIPTION OF THE INVENTION

In accordance with the present invention, there is provided apparatus for orienting generally non-cylindrical and non-spherical asymmetrical items. The apparatus includes a frame having an inlet slot for permitting entrance of the item to an orientation station. The orientation station comprises means defining a predetermined space which is at least as wide as the width of the item.

A central support is located at the orientation station for underlying the item thereat. The central support extends along the length of the item and is substantially centered with respect to the orientation station.

The means for defining a predetermined space and the central support cooperate to permit the item to pivot about the central support. Means are provided for preventing the item from pivoting until a selected portion of the item engages a beveled portion of the orientation station. The bevel is formed at the orientation station for forcing the item to pivot about the central support in a predetermined direction responsive to engagement of the selected portion of the item with the bevel.

A more detailed explanation of the invention is provided in the following description and claims, and is illustrated in the accompanying drawings.

BRIEF DESCRIPTION OF THE DRAWINGS

FIG. 1 is a perspective view of feeding and orientation apparatus constructed in accordance with the principles of the present invention;

FIG. 2 is a plan view of a typical item that can be oriented utilizing the principles of the present invention;

FIG. 3 is a perspective view of orientation apparatus constructed in accordance with the principles of the present invention;

FIG. 4 is a top plan view thereof;

FIG. 5 is a front elevational view thereof;

FIG. 6 is a left-side elevational view thereof;

FIG. 7 is a right-side elevational view thereof;

FIG. 8 is a fragmentary, enlarged perspective view of a portion thereof, showing a key at the orientation station, with portions broken for clarity; and FIG. 9 is a fragmentary, cross-sectional view taken along the line 9—9 of FIG. 8.

DETAILED DESCRIPTION OF THE ILLUSTRATIVE EMBODIMENT

Referring to the figures, in FIG. 1 there is shown an orientation device 10 connected to a conventional vibratory feeder 12. Feeder 12 includes a conventional vibratory feeder drive unit 14 together with a steel feeder bowl 20. The feeder drive unit 14 is connected to a suitable source of electrical current via line 16 and is mounted upon a base 18. Feeder bowl 20 is of conventional design having a conventional vibrating plate therein with helical platform 22 for transporting the items upwardly (in the counterclockwise direction with respect to FIG. 1) to main platform 24 which directs the items to the inlet of orientation device 10. The items which fall are collected by platform 26 and are directed by that platform back to the vibratory plate.

It is to be understood that the type of feeding apparatus utilized is conventional and may be either the type illustrated and described above or a linear conveyor, or any other suitable feeding apparatus.

The illustrative embodiment of the invention comprises orientation device 10 which is illustrated in perspective in FIG. 3. As stated above, the purpose of this device is to orient generally non-cylindrical and non-spherical asymmetrical items, such as the keys 28 shown in FIGS. 2 and 3. It is seen by referring to FIG. 3 in particular that key 28 exits orientation device 10 with its tang 28 having an attitude wherein the trailing forward surface 30 extends upwardly and the leading forward surface 32 extends downwardly. It can be seen that the purpose of the orientation device 10 is to orient an asymmetrical item, such as a key, so that a selected lagging surface has a predetermined attitude with respect to a selected leading surface.

Although in the illustrative embodiment the forward portion of a key tang 28a is selected for determining the orientation attitude, another portion of the key, such as the portion 34 connecting the head 28b and the tang 28a, could be selected. In FIG. 2, it is seen that portion 34 is asymmetrical with respect to the axis of the key and the orientation device could be formed, as will be discussed below, in a manner so that leading surface 34a of portion 34 faces downwardly when the key exits from the orientation device.

The structure of orientation device 10 will now be described. Orientation device 10 comprises a top main plate 40 which is stamped to have walls 42a, 42b, 42c, 42d, 42e, 42f and 42g defining a keyturning space 44 for the general orientation station. The rear of the orientation station is defined by a wall 46 of a top back plate 48 and a lower back plate 50 which is spaced vertically from top back plate 48 by extensions 40a and 40b of top plate 40, as shown most clearly in FIGS. 7 and 8. The vertical spacing serves to form an inlet slot for permitting the key to enter the orientation station.

A central support 56, having a relatively small top plane, underlies and abuts plate 40 and underlies and abuts lower back plate 50. It can be seen that central support 56 extends the entire length of the orientation station 44 and is equally spaced from walls 42a and 42g, as well as from walls 42c and 42e. Underlying the structure is a trough 60 formed of two plates 62 and 64 connected in a generally V-shaped configuration, as shown most clearly in FIGS. 3, 6 and 7. The top portions of plates 64 and 62 are suitably welded at 66 to the underside of plate 50, and the plates are connected together by suitable connecting means 68.

Walls 42a–g are formed to define a space that is slightly larger than the key to be oriented. Top back plate 48 is located so that wall 46 will prevent key 28 from turning in the space defined by walls 42a–g until key 28 has moved forward all the way so that its forward end contacts wall 42d. As seen in FIGS. 8 and 9, wall 42d is beveled downwardly and forwardly so that when the leading surface of the forward portion of tang 28a engages wall 42d, beveled wall 42d will cam key 28 thereby forcing it to pivot about central support 56 in the direction of the leading surface of the front portion of the key's tang. The key will fall into trough 60 and exit vertically, as shown in FIG. 3, with lagging surface 30 facing upwardly.

Likewise, wall 42b, or 42f, could be shaped and beveled so as to cam another leading surface of the key (such as surface 34a if surface 34a is formed to lead surface 34b), thereby forcing it to pivot about central support 56 and fall into trough 60. It can be seen that any asymmetrical portion of a non-cylindrical and non-spherical item can be selected, and the orientation station has a space that is only slightly larger than the item so that the item cannot pivot until the selected portion of the item engages one of the walls defining the space, whereby said one wall is beveled and will act to cam the item into a receptacle with the leading surface of the selected portion leading the item into the receptacle.

Although an illustrative embodiment of the invention has been shown and described, it is to be understood that various modifications and substitutions may be made by those skilled in the art without departing from the novel spirit and scope of the present invention.

What is claimed is:

1. Apparatus for orienting generally non-cylindrical and non-spherical asymmetrical items, which comprises: a frame having an inlet slot for permitting entrance of the item to an orientation station which is longitudinally spaced from said entrance, said orientation station comprising means defining a predetermined space in said frame which is at least as wide as the width of the item and having a beveled portion, a central support located at said orientation station for underlying the item thereat; said central support extending along the length of the item and being substantially centered with respect to said orientation station, said means for defining a predetermined space and said central support cooperating to permit the item to pivot about said central support, means for preventing the item from pivoting until a selected portion of the item engages said beveled portion of said orientation station, said bevel being formed at the orientation station for forcing the item to pivot about said central support in a predetermined direction responsive to engagement of said selected portion of the item with said bevel.

2. Apparatus as described in claim 1, wherein said bevel extends downwardly and forwardly to overlie said selected portion and to force the item to pivot in the general direction of the leading surface of said selected portion.

3. Apparatus as described in claim 1, wherein said predetermined space is generally similar in shape to the shape of the item and said means for defining said predetermined space comprises a plate having said space formed therein, said bevel being provided at a selected location on the wall of said plate which selected location is adapted for engagement with said selected portion of the item.

4. Apparatus as described in claim 3, wherein said bevel extends downwardly and forwardly to overlie said selected portion and to force the item to pivot in the general direction of the leading surface of said selected portion.

5. Apparatus as described in claim 1, wherein the item is a key blank and said bevel is formed at the forward end of said orientation station to provide pivotal action in response to engagement of the forward end of the key's tang with said bevel.

6. Apparatus as described in claim 1, and further including a trough underlying said orientation station, to receive the item therein after it pivots about said central support, said trough forming a guide track outlet for the item.

7. Apparatus for orienting keys, which comprises: a frame having an inlet slot for permitting entrance of one key at a time to an orientation station which is longitudinally spaced from said inlet slot, said orientation station comprising means defining a predetermined space in said frame which is slightly larger than the key and generally similar in shape to the shape of the key; said means having a beveled portion; a central support located at said orientation station for underlying the key thereat; said central support extending along the length of the key and being substantially centered with respect to said orientation station, said means for defining a predetermined space and said central support cooperating to permit the key to pivot about said central support, means at the rear of the orientation station for preventing the key from pivoting until a selected portion of the key engages said beveled portion of said orientation station, said bevel being formed at a selected location on a wall spaced from the rear wall of the orientation station which selected location is adapted for engagement with the selected portion of the key, for forcing the key to pivot about said central support in a predetermined direction responsive to engagement of said selected portion of the key with said bevel.

* * * * *